United States Patent [19]

Pyle

[11] Patent Number: 5,589,643
[45] Date of Patent: Dec. 31, 1996

[54] ACROSS THE WALL PRESSURE DIFFERENTIAL INDICATOR

[76] Inventor: Robert D. Pyle, 3286 Balsam Ridge St., White Oak, Ohio 45239

[21] Appl. No.: 428,503

[22] Filed: Apr. 25, 1995

[51] Int. Cl.⁶ .................................................. G01F 1/28
[52] U.S. Cl. ........................... 73/861.75; 73/700; 73/756
[58] Field of Search .......................... 73/861.75, 861.74, 73/861.76, 861.77, 700, 756; 454/271, 272, 273, 274

[56] References Cited

U.S. PATENT DOCUMENTS

| | | |
|---|---|---|
| 960,917 | 6/1910 | Henderson ............................ 454/274 |
| 988,946 | 4/1911 | Oberman ............................... 454/274 |
| 2,605,639 | 8/1952 | Gentile, Jr. . |
| 2,647,402 | 8/1953 | Ibbott . |
| 3,282,103 | 11/1966 | Steele . |
| 3,463,003 | 8/1969 | Pierman et al. ...................... 73/861.75 |
| 3,564,917 | 2/1971 | Cronin et al. ........................ 73/861.75 |
| 3,826,136 | 7/1974 | Chang .................................. 73/861.75 |
| 4,133,213 | 1/1979 | Brandt, Jr. . |
| 4,154,101 | 5/1979 | Buchanon et al. ................... 73/861.75 |
| 4,160,380 | 7/1979 | Dunne, Jr. et al. . |
| 4,170,899 | 10/1979 | Fujita et al. . |
| 4,453,417 | 6/1984 | Moyers et al. . |
| 4,454,765 | 6/1984 | Lodge . |
| 4,480,467 | 11/1984 | Harter et al. . |
| 5,444,947 | 8/1995 | Miller ................................... 454/271 |

FOREIGN PATENT DOCUMENTS 1222797  6/1960  France ................................ 454/271

OTHER PUBLICATIONS

Engineering and Applications Handbook, Dwyer Instruments, Inc. (1991).

*Primary Examiner*—Richard Chilcot
*Assistant Examiner*—Paul D. Amrozowicz
*Attorney, Agent, or Firm*—Steven J. Rosen

[57] ABSTRACT

A pressure differential indicating apparatus having a wall duct with first and second ends, first and second flange like mounting plates respectively disposed around and attached to the first and second ends, and a low speed airflow indicator mounted at one of the ends on a side of the mounting plate opposite that to which the wall duct is mounted. The low speed airflow indicator is adapted to indicate a specified pressure differential or range of pressure differential across a wall. The wall duct is preferably an adjustable length wall duct having two sections, a first section attached to the first mounting plate and a second section attached to the second mounting plate, wherein one of the two sections is constructed so as to be slidingly disposed in and in sealing engagement with the other of the two sections. The airflow indicator may be mounted within an extension of a clear plastic form of the duct second section. The extension extending past the mounting plate on the side of the wall on which the indicator is disposed.

10 Claims, 3 Drawing Sheets

ACROSS THE WALL PRESSURE DIFFERENTIAL INDICATOR

BACKGROUND OF THE INVENTION

1. Field of the Invention

This invention relates to pressure differential indicators and more particularly to such pressure differential indicators that use low airflow rate indicators to indicate and allow monitoring of pressure differentials across walls.

2. Description of Related Art

Some specific spaces or rooms such as at a hospital require a proper negative pressure in the interior space or room in order to prevent germs or virus dissipating through a fissure by airflow to an exterior space outside the room such as an exterior room, hallway or corridor. The interior air pressure is lower than that at the exterior because airflow travels from a space of higher pressure to a space of lower pressure. It is well known to provide a device that keeps the interior air pressure lower than that of the exterior in order to maintain a clean and healthy environment, such a system is described in U.S. Pat. No. 5,228,306. It is necessary for the doctors, nurses, and other concerned employees and individuals to easily monitor whether or not a proper vacuum (a negative pressure differential) is being maintained in a room from outside the room such as in the hallway or corridor. Fairly sophisticated devices, usually electronically controlled, have been developed for this purpose. However, these devices are expensive to procure and maintain and subject to failure. Furthermore, because the pressure differential across such walls, particularly hospital walls, is very small, present day devices are expensive and difficult to maintain and calibrate. Therefore, the present invention has been developed which incorporates a preferably adjustable airflow duct across the wall between the low and high pressure spaces and a low airflow indicator on the side of the wall opposite the space that is to be monitored to indicate air pressure differentials and particularly low pressure differentials across walls.

Low air velocity gauges for measuring low air flow rates are well known in the art. One conventional air velocity measuring device uses a hot wire anemometer, which requires electrical power to operate and is expensive. A relatively less expensive mechanical device in the prior art, a rotational vane type that has a number of intricate moving parts that require maintenance, is still relatively expensive and is not easy to monitor by a person walking down a hospital hall. A low air velocity gauge is disclosed in U.S. Pat. No. 4,154,101 to provide a low cost velocity gauge of simplified and trouble free nature that reliably measures air velocity or draft movement in the low air flow 20–400 feet per minute rate range.

SUMMARY OF THE INVENTION

The present invention is a pressure differential indicating an apparatus having a wall duct with first and second ends, first and second flange like mounting plates respectively, disposed around and attached to the first and second ends, and a low speed airflow indicator mounted at one of the ends on a side of the mounting plate opposite that to which the wall duct is mounted. The low speed airflow indicator is adapted to indicate a specified pressure differential or range of pressure differential across a wall. The wall duct is preferably an adjustable length wall duct having two sections, a first section attached to the first mounting plate and a second section attached to the second mounting plate, wherein one of the two sections is constructed so as to be slidingly disposed in and in sealing engagement with the other of the two sections. The airflow indicator includes inlet and outlet ports, each of which is disposed through one of opposite end walls of a housing of the airflow indicator, one of the end walls abuts or is close to one of the mounting plates, and a first cross-sectional area of the wall duct is substantially greater than a second cross-sectional area of the port in the end wall that is adjacent to one of the mounting plates. The airflow indicator includes a housing having wall portions defining a planar draft way extending therethrough and a draft inlet port thereto and a draft outlet port therefrom that are aligned with the plane of and approximate the size of the way. An elongate vane is pivotably suspended pendulum fashion from an upper portion of the housing adjacent to the inlet port and disposed transversely of the draft way plane such that the vane is pivotally mounted adjacent its upper end for free swinging movement between an at rest vertically disposed position for zero air flow through the way to an inclined position angled in the direction of air flow through the way on air flow being induced through the way. The vane is proportioned to substantially partition off the way when the vane is in its at rest position and the vane preferably is a length of stripping of film thickness dimensions. The strip may have indentation means extending longitudinally thereof for holding the strip against flexure. The airflow indicator may be mounted within an extension of a clear plastic form of the duct. The extension extending past the mounting plate on the side of the wall on which the indicator is disposed.

ADVANTAGES

Among the advantages provided by the present invention is an inexpensive, low maintenance, easy to build wall mounted pressure differential indicator that can indicate a low pressure differential across a wall. Other advantages of the present invention includes; it uses no electricity, it can easily be installed in existing walls, and it is adjustable so that it provides the proverbial advantage of "one size fits all".

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
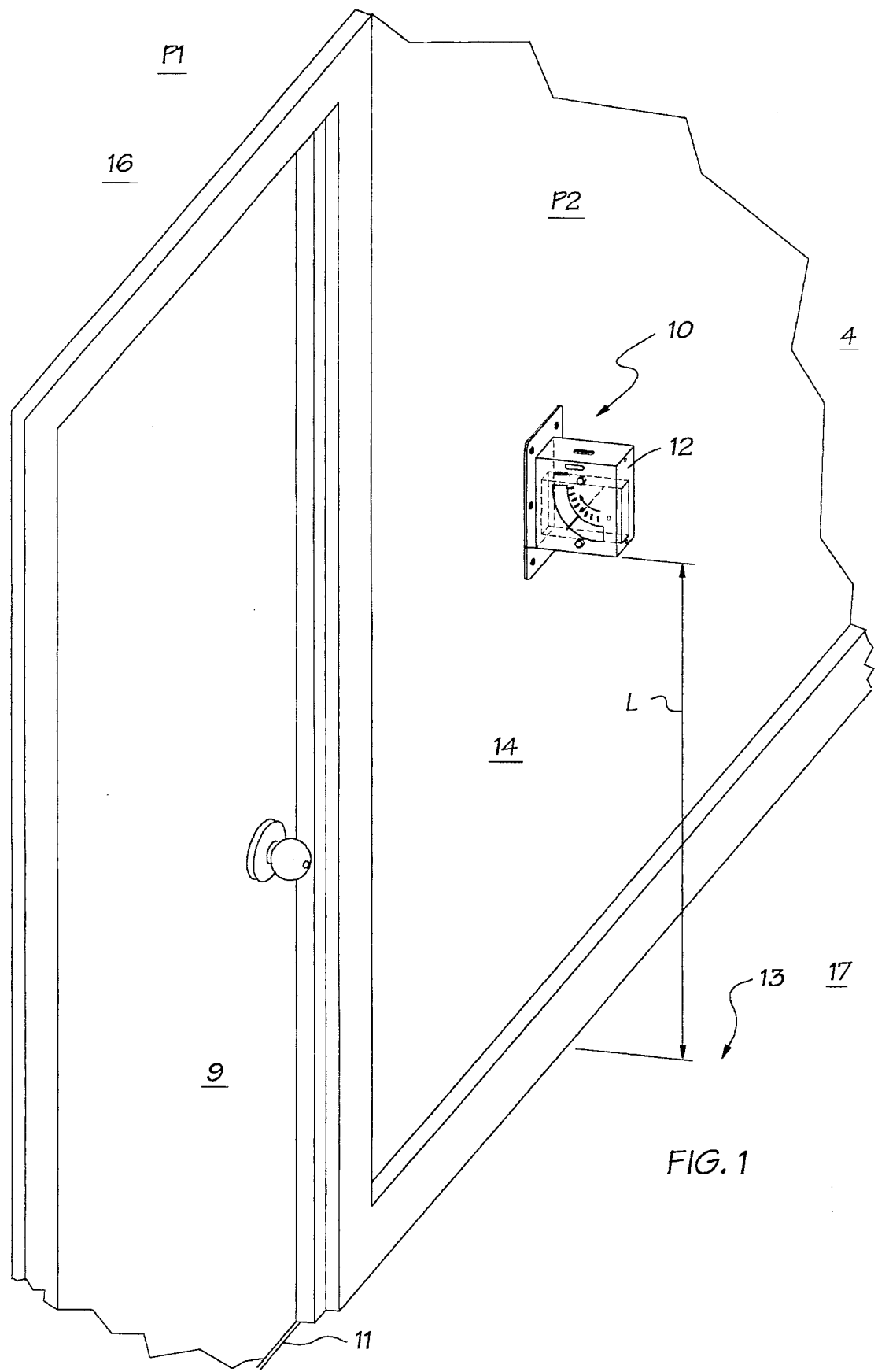
FIG. 1 is a perspective view of a room and a pressure differential indicator in accordance with an exemplary embodiment of the present invention mounted on the wall.

Illustrated in FIG. 1 is an exemplary embodiment of the present invention, a pressure differential indicating apparatus 10 having a low speed airflow indicator 12 adapted to indicate a pressure differential across a wall 14 of a room 16. The pressure differential indicating apparatus 10 is operably mounted so that the indicator 12 is positioned on the wall 14 outside of the room 16 at an easily observable level L (eye level or other) above the floor 13 of the corridor 17. The room 16 is typical of one often found in a hospital which requires a proper negative pressure in the interior space or room 16 in order to prevent germs or virus dissipating through a fissure 11 such as may be found under a door 9 by airflow to an exterior space outside the room such as an exterior room, hallway, or corridor 17. The interior air pressure indicated by P1 is lower than that of the exterior air pressure P2 because airflow travels from a space of higher pressure to a space of lower pressure.

Figure 2:
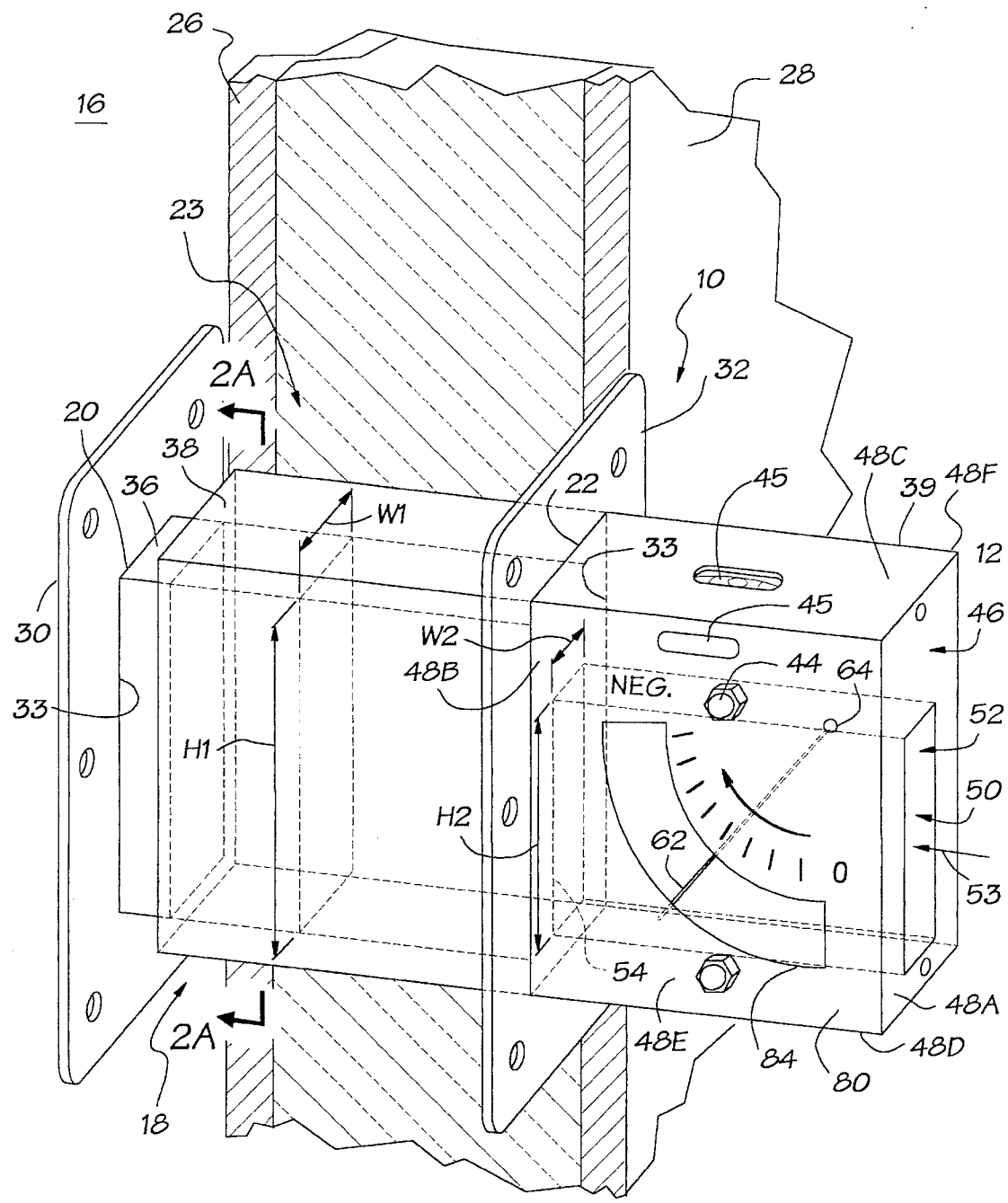
FIG. 2 is an enlarged partially cut-away perspective view of the pressure differential indicator illustrated in FIG. 1.
Figure 2A:
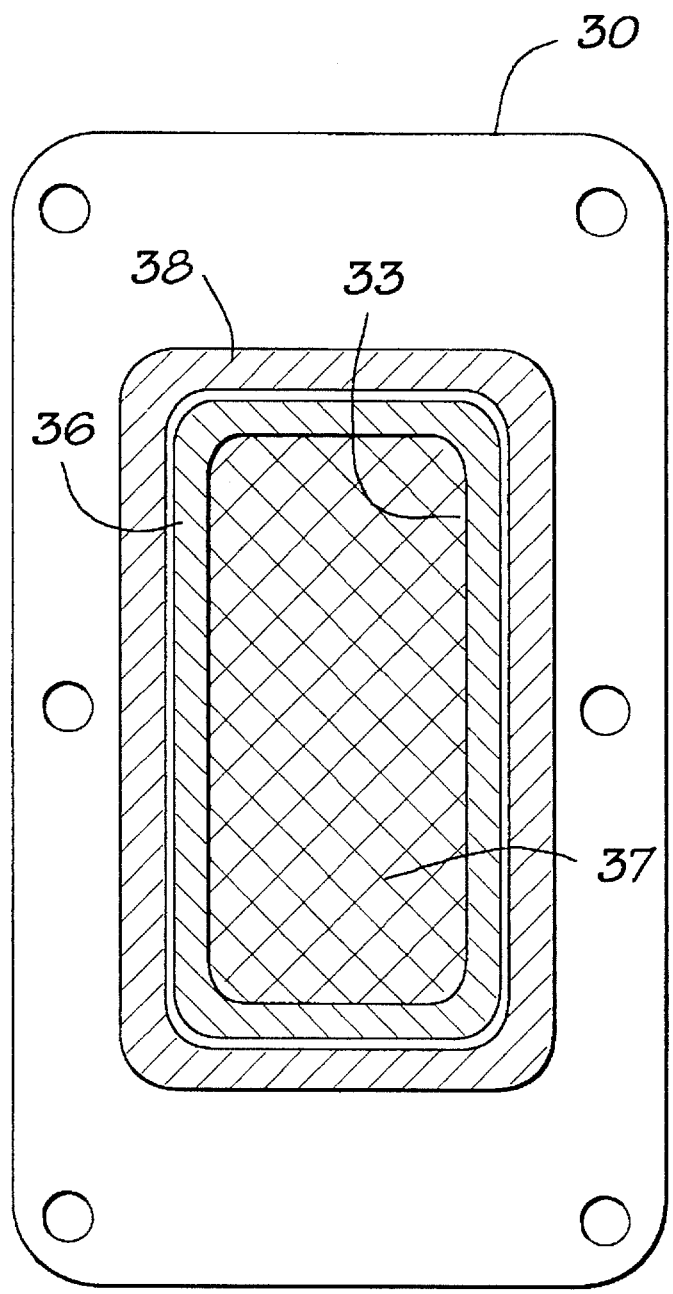
FIG. 2a is a frontal view along 2A—2A of a mounting plate of the apparatus in FIG. 2.

Referring now to FIG. 2 the pressure differential indicating apparatus 10 includes a wall duct 18 to which the low speed airflow indicator 12 mounted in operable fluid communication such that all airflow passing through the wall duct also passes through the indicator. The wall duct 18 has first and second open ends 20 and 22 respectively which are correspondingly disposed through a hole 23 which extends through the wall 14. Flange like first and second mounting plates 30 and 32 respectively having apertures 33 are connected to the first and second open ends 20 and 22 of the wall duct 18 and mounted to oppositely facing first and second sides 26 and 28 respectively of the wall 14. The plates are attached to the ends in a flange like fashion surrounding the first and second open ends 20 and 22 such to allow unrestricted airflow to pass through the first and second open ends 20 and 22. The airflow indicator 12 is mounted on a side of the second mounting plate 32 opposite that by which the second mounting plate is mounted to the wall 14 such that all airflow passing through the wall duct 18 also passes through the indicator. Referring briefly to FIG. 2A a screen 37 may be placed over the apertures 33 shown as the one on the room side of the wall 14, on the first open end 20.

The wall duct 18 is preferably an adjustable length wall duct having two sections, a first section 36 attached to the first mounting plate 30 and a second section 38 attached to the second mounting plate 32. One of the two sections is constructed so as to be slidingly disposed in and in sealing engagement with the other of the two sections. The exemplary embodiment illustrated in the FIGS. has the first section 36 slidingly disposed in and in sealing engagement with the second section 38. The second section 38 of the wall 14 may be made of plexiglass and include an extension 39 which extends through and a distance past the second mounting plate 32 to provide a convenient casing into which the indicator 12 may be mounted. The indicator 12 can be mounted by screws 44 or some other means of attachment to the second section 38 and the indicator 12 may include bubble levels 45 to help mount the entire apparatus and adjust the indicator parallel to the floor. The wall duct 18 provides an airway between the inside and outside of the room in order to develop a low speed airflow from the lower pressure area in the hallway outside the room to the lower pressure area inside the room.

The airflow indicator 12 includes a housing 46 having front, back, top, bottom, left, and right wall portions 48a–48f respectively defining a rectangular draft way 50 extending therethrough. The front wall portion 48a has a port 52 and the back wall portion 48b has a draft outlet port 54 and the approximate size of the draft way 50. An elongated vane 62 is suspended pendulum fashion from an upper portion 64 of the housing 46 adjacent to the inlet port 52 and is disposed perpendicular to the left and right wall portions 48e and 48f and transversely of the draft way 50. The vane 62 is pivotally mounted adjacent its upper end for free swinging movement between an at rest vertically disposed position for zero air flow through the way to an inclined position angled in the direction of air flow, indicated by arrow 53, through the way for air flow that is induced through the way by a pressure differential across the wall 14. The vane 62 is proportioned to substantially close off the way when the vane is in its vertical at rest position and the vane, preferably, is a length of stripping of film thickness dimensions. The strip may have indentation means extending longitudinally thereof for holding the strip against flexure. Dwyer Instruments, Inc. in Indiana is a commercial vendor that can supply such an indicator, suitable for use in the present invention, and based on an Air Velocity Gauge disclosed in U.S. Pat. No. 4,154,101.

The airflow indicator 12 is mounted such that the front wall portion 48a and its draft outlet port 54 abuts or is close to the second mounting plate 32. A first cross-sectional area of the wall duct 18 as defined by a first width W1 and first height H1 of the rectangular wall duct is substantially greater than a second cross-sectional area of the draft outlet port 54 as defined by a second width W2 and a second height H2. This assists in providing an unrestricted area for an airflow indicative of the pressure differential across the wall to develop. Mounting the airflow indicator 12 in a clear plastic duct allows for ease of use and manufacture because the airflow indicator 12 may be reversed such that the inlet port 52 and vane 62 are positioned close to the second mounting plate 32 and its aperture 33 if one wanted the apparatus to indicate a positive pressure differential across the wall 14 as opposed to a negative pressure differential or pressure drop across the wall with respect to an observer outside the room 16.

A face plate 80 is mounted in the housing and has an arcuate slot 84 to form a window for viewing the position of vane. The face plate 80 has markings to indicate the a desired pressure drop or range. It need not be calibrated or gauged. This provides an easily read indicator for informing observers passing by that sufficient pressure drop exists across the wall and that equipment designed to maintain the pressure drop is operating.

While the preferred embodiment of the present invention has been described fully in order to explain its principles, it is understood that various modifications or alterations may be made to the preferred embodiment without departing from the scope of the invention as set forth in the appended claims.

I claim:

1. An across the wall pressure differential indicating apparatus comprising:

a wall duct having first and second open ends, first and second mounting plates respectively attached to said wall duct at said first and second open ends respectively, and a low speed airflow indicator is adapted to indicate a pressure differential and is mounted in full fluid communication with said wall duct at one of said ends such that all airflow passing through said wall duct also passes through said indicator.

2. An apparatus as claimed in claim 1 wherein said wall duct is an adjustable length wall duct.

3. An apparatus as claimed in claim 2 wherein said adjustable length wall duct comprises two sections wherein a first section is attached to said first mounting plate and a second section is attached to said second mounting plate and one of said two sections is constructed so as to be slidingly disposed in and in sealing engagement with the other of said two sections.

4. An apparatus as claimed in claim 2 wherein said airflow indicator includes inlet and outlet openings each of which is disposed through one of opposite end walls of a housing of said airflow indicator, one of said end walls is attached to one of said mounting plates, and a first cross-sectional area of said wall duct is substantially greater than a second cross-sectional area of said opening in said end wall that is attached to one of said mounting plates.

5. An apparatus as claimed in claim 1 wherein said airflow indicator comprises:

a housing having wall portions defining a planar draft way extending therethrough and a draft inlet port thereto and a draft outlet port therefrom that are aligned with the plane of and approximate the size of said way, an elongate vane pivotably suspended from an upper portion of said housing adjacent to said inlet port and disposed transversely of said draft way, said vane being pivotally mounted adjacent its upper end for free swinging movement between an at rest vertically disposed position for zero air flow through said way to an inclined position angled in the direction of air flow through said way on air flow being induced through said way, and said vane being proportioned to substantially partition off said way when said vane is in its at rest position.

6. An apparatus as claimed in claim 5 wherein said vane comprises a length of stripping of film thickness dimensions.

7. An apparatus as claimed in claim 6 wherein said length of stripping includes indentation means extending longitudinally thereof for holding same against flexure.

8. An apparatus as claimed in claim 5 wherein said wall duct is an adjustable length wall duct.

9. An apparatus as claimed in claim 8 wherein said adjustable length wall duct comprises two sections wherein a first section is attached to said first mounting plate and a second section is attached to said second mounting plate and one of said two sections is constructed so as to be slidingly disposed in and in sealing engagement with the other of said two sections.

10. An apparatus as claimed in claim 5 wherein a first cross-sectional area of said wall duct is substantially greater than a second cross-sectional area of said opening in said end wall that is attached to one of said mounting plates.

* * * * *